May 5, 1931. F. G. SHERER 1,803,734
ICE FREEZING RECEPTACLE WALL
Filed March 11, 1929
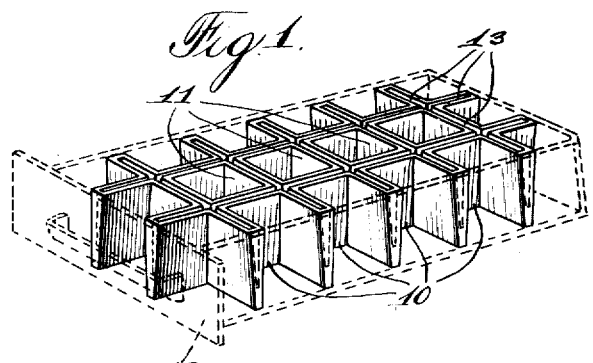
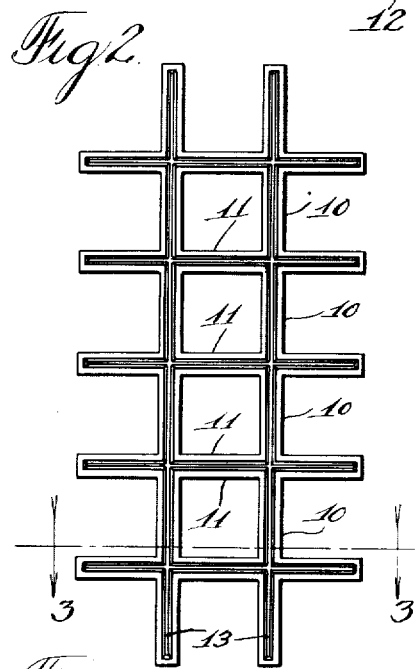
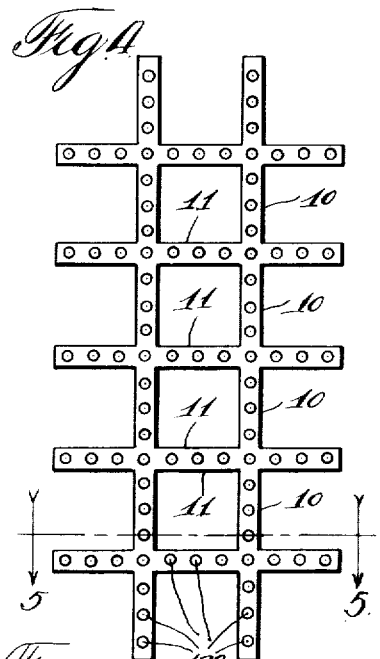
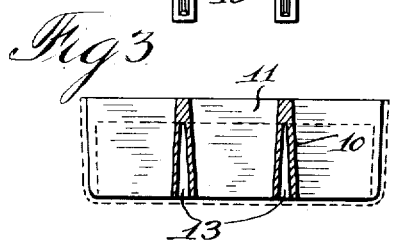
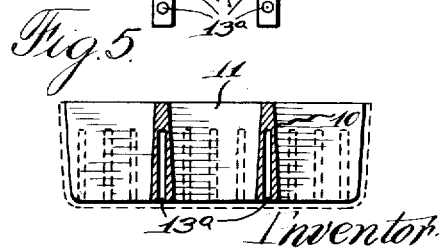

Patented May 5, 1931

1,803,734

UNITED STATES PATENT OFFICE

FRANK G. SHERER, OF LOS ANGELES, CALIFORNIA, ASSIGNOR TO REFRIGERATOR GRID CO., OF CHICAGO, ILLINOIS, A CORPORATION OF ILLINOIS

ICE-FREEZING RECEPTACLE WALL

Application filed March 11, 1929. Serial No. 345,905.

This invention relates to improvements in the walls of ice-freezing receptacles and particularly such walls as may become imbedded in the ice during freezing, as, for example, the walls of ice grids used in the freezing trays or pans of refrigerators to divide the cake of ice which forms in the tray or pan into smaller sections or cubes suitable for individual use.

The ordinary ice grid is made of thin, solid metal strips. When hot water is poured over the cake of ice with imbedded grid to free the ice from the grid, the heat strikes merely the thin edges of the grid strips or walls. Accordingly, it takes considerable time for the heat to penetrate throughout the width of these walls or strips sufficiently to draw the frost therefrom whereby to permit the ice in the pockets of the grid to fall out or to be easily pressed or jarred out. During this time, also, the hot water is fast melting the ice, causing a loss ordinarily of twenty to twenty-five per cent of the ice. Besides, this prolonged procedure is exceedingly annoying and frequently results in injury to the hands in an effort to hasten the same. Another disadvantage encountered in the use of such grids of thin, solid strips is that a considerable length of time is required for freezing the ice cubes.

It is an object of my invention to provide an ice receptacle with walls so constructed and arranged that though imbedded in the ice, the heat of the fluid employed to free the ice therefrom can penetrate very quickly to all parts thereof and thus quickly withdraw the frost from the walls so that the cubes of ice in the pockets of the grid may drop out or can be readily pressed or jarred out with a minimum loss of time, annoyance, and effort, this construction likewise serving to transfer the heat more rapidly away from the water to be frozen so that a substantial saving of time is also effected during the freezing operation.

In carrying out my invention in a grid, for example, I provide the members or strips thereof with hollow portions of greater or less extent whereby when the frozen cake of ice is removed from the freezing tray or pan a heated fluid may be caused to flow into such hollow portions thereby quickly to heat the grid walls in contact with the ice and thus release the same. In order readily to apply the heated fluid, which is usually hot water, the hollow portions preferably open at one edge of the grid strips or members. The bottom edge is preferred for these openings as the water in the freezing tray cannot displace the confined air in said hollow portions and, accordingly, they do not become filled with ice during the freezing process. When, therefore, the cake of ice with imbedded grid is removed from the freezing tray or pan and hot water is poured over its bottom surface in the usual manner, it flows into and fills these hollow portions in the grid strips or walls and thus quickly heats the same sufficiently to release the cubes which fall out or may be readily jarred or pressed out. The same results are obtained if the grid is formed with the hollow spaces opening on the upper edges, which arrangement I prefer to utilize in some cases. Thus a saving of time, annoyance, and ice results.

Further objects and advantages will appear from the description and claims to follow, in connection with the accompanying drawing, in which two forms of grids embodying my invention are shown, and in which Fig. 1 is a perspective view of one form of grid, shown bottom side up the better to illustrate the hollow construction of its wall members or strips, the freezing tray being shown in position in dotted lines;

Fig. 2 is a bottom plan view of the said grid removed from the pan;

Fig. 3 is a cross-sectional view of the grid on the line 3—3 of Fig. 2 and showing the grid in the position it occupies in the freezing tray, which is indicated in dotted lines;

Fig. 4 is a bottom plan view, similar to Fig. 2, of a grid having its hollow positions formed in another way; and Fig. 5 is a cross-sectional view on line 5—5 of Fig. 4 showing the said grid in upright position in the freezing tray, the latter being indicated by dotted lines.

In these figures of the drawing, in which the same reference characters represent the same parts throughout the several views, and referring, first, to Figs. 1, 2 and 3, the ice grid comprises the longitudinal and transverse wall members or strips 10 and 11 suitably secured together to form small, square or rectangular pockets therebetween, and removable as a unit from the freezing tray or pan 12 in the usual manner.

These grid walls, strips, or members are preferably tapering in cross-section toward their upper edges and are made hollow substantially throughout as indicated by the longitudinal recesses 13 extending substantially from end to end of the strips, which recesses are open at the lower, wider edges of the said strips.

By placing the grid in the tray or pan with these recess openings at the bottom the water in the tray is prevented from filling the recesses by reason of the confined air therein. Hence, in freezing, the ice does not fill in these hollow portions or recesses of the grid strips. Accordingly, when the cake of ice with imbedded grid is removed from the tray and hot water is poured over its bottom surface, then held uppermost, the water fills and flows through these grid recesses and quickly heats the walls to draw out the frost. The ice cubes then quickly fall out or can be easily pressed, jarred or shaken out of the pockets of the grid.

The tapering section of the grid strips assists in this action, and would do so even if the strips were solid because of the resulting expanding area of the pockets toward the top which frees the ice cubes once they start to move and because of the greater exposed width of the bottom edges of the strips to the hot water and the lessened thickness of the material imbedded in the ice. It requires less heat to extract the frost under these conditions than if the same amount of material were made into strips of uniform thickness throughout their depth.

The grid may be made or built up of any suitable material and in any desired way though I prefer at present and intend to represent in Figs. 1, 2, and 3, a die casting of copper, aluminum or any desired or suitable material. By this means the entire grid is made up as a unit and as a finished product and the hollow portions are readily formed. The grid may be moulded also, particularly if made of a mouldable material such as bakelite.

The ends of the grid strips are preferably made to fit the sloping edges of the freezing tray or pan which insures the grid being put in the tray right side up.

In Figs. 4 and 5 the hollow portions or recesses in the grid strips or walls are not continuous as in Figs. 1, 2, and 3 but are in the form of holes or openings, 13—a, drilled or otherwise formed from the bottom edges of the grids as far toward the opposite edges as desired or as permitted by the thickness of the strips. These openings may be as close together or as far apart as desired and may be oblong in section and as long as desired.

The operation and results are the same in the form shown in Figs. 4 and 5 as in that shown in Figs. 1, 2 and 3. The water to be frozen is prevented from filling the holes or openings in the grid strips by the air confined therein and for this reason the ice does not fill the same. Accordingly, when hot water is applied thereto, it enters these holes or hollow portions 13a, and the heat quickly penetrates throughout the strips causing the ice in the pockets to be quickly released.

By the constructions indicated the walls of the grid strips may be made very thin and still be strong enough for their purpose. The thinner the walls the quicker the heat effects the release of the ice.

While I have shown my invention as embodied in a grid, it may be embodied in other devices, as, for example, in the freezing tray or pan itself, that is, instead of a removable grid the material of the tray or pan itself may be formed up from the bottom thereof so as to form inverted V-shaped hollow ribs extending upwardly from the bottom of the tray or pan and open at the bottom. When the ice which forms in the tray or pan made in this way is to be removed, hot water is poured over the bottom of the tray and fills the hollow walls of the ribs, thus quickly freeing the ice which drops out in the form of the desired cubes or blocks. In this way all the ice does not have to be removed from the tray at one time. A few only of the pockets need be emptied, if desired, by pouring the hot water over that portion of the bottom of the tray only and around through the hollow ribs or walls surrounding the cubes to be removed. The tray may be made of a number of separate small receptacles of the size and form desired secured together at their upper edges but having their sides and bottoms exposed. The ice can be removed from these individually or collectively by applying the hot water to the bottoms and sides of more or less of the receptacles.

The individual blocks of ice produced may have any desired shape or size.

I claim:

1. The combination with an ice-freezing tray of a refrigerator, said tray having sloping side edges, of a grid removably fitting said tray at its bottom and side edges, said grid comprising members tapering in cross section from the bottom to the top, and said grid members having hollow portions extending from their bottom edges toward the top edges.

2. A removable ice grid comprising a plurality of crossing members, said members being tapering in cross section and wider at the bottom, said members being hollow substantially from end to end, the hollow spaces opening at the lower edges of the members.

3. A cast metal grid comprising hollow tapering members, the hollow portions of said members extending from the lower wider edges of the members toward the narrower upper edges and substantially throughout their lengths.

4. A removable ice grid comprising a plurality of vertically disposed crossing members, each having a vertically extending hollow space therein open at one edge of the member.

5. A removable ice grid comprising a plurality of vertically disposed crossing members of relatively great heat conductivity, each having a vertically extending hollow space therein open at one edge of the member.

6. A removable ice grid comprising a plurality of vertically disposed crossing members of relatively thick metal, each having a vertically extending hollow space therein open at one edge of the member.

7. A removable ice grid comprising a plurality of vertically disposed crossing members, each having a vertically extending hollow space therein open at one edge of the member, the entire grid being integrally formed of cast metal.

8. A removable ice grid comprising a plurality of vertically disposed walls tapering in cross section between the top and bottom edges thereof and each having a vertically extending hollow space therein open at one edge of the member.

9. A removable ice grid comprising a plurality disposed walls of relatively great heat conductivity, each tapering in cross section between the top and bottom edges thereof.

In witness whereof, I have hereunto subscribed my name.

FRANK G. SHERER.

tially from end to end, the hollow spaces opening at the lower edges of the members.

3. A cast metal grid comprising hollow tapering members, the hollow portions of said members extending from the lower wider edges of the members toward the narrower upper edges and substantially throughout their lengths.

4. A removable ice grid comprising a plurality of vertically disposed crossing members, each having a vertically extending hollow space therein open at one edge of the member.

5. A removable ice grid comprising a plurality of vertically disposed crossing members of relatively great heat conductivity, each having a vertically extending hollow space therein open at one edge of the member.

6. A removable ice grid comprising a plurality of vertically disposed crossing members of relatively thick metal, each having a vertically extending hollow space therein open at one edge of the member.

7. A removable ice grid comprising a plurality of vertically disposed crossing members, each having a vertically extending hollow space therein open at one edge of the member, the entire grid being integrally formed of cast metal.

8. A removable ice grid comprising a plurality of vertically disposed walls tapering in cross section between the top and bottom edges thereof and each having a vertically extending hollow space therein open at one edge of the member.

9. A removable ice grid comprising a plurality disposed walls of relatively great heat conductivity, each tapering in cross section between the top and bottom edges thereof.

In witness whereof, I have hereunto subscribed my name.

FRANK G. SHERER.

CERTIFICATE OF CORRECTION.

Patent No. 1,803,734.     Granted May 5, 1931, to

FRANK G. SHERER.

It is hereby certified that error appears in the printed specification of the above numbered patent requiring correction as follows: Page 3, line 38, claim 9, before the word "disposed" insert the words of vertically; and that the said Letters Patent should be read with this correction therein that the same may conform to the record of the case in the Patent Office.

Signed and sealed this 7th day of July, A. D. 1931.

(Seal)                              M. J. Moore,
Acting Commissioner of Patents.

CERTIFICATE OF CORRECTION.

Patent No. 1,803,734. Granted May 5, 1931, to

FRANK G. SHERER.

It is hereby certified that error appears in the printed specification of the above numbered patent requiring correction as follows: Page 3, line 38, claim 9, before the word "disposed" insert the words of vertically; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.